United States Patent [19]

Chenevey et al.

[11] 4,005,058
[45] Jan. 25, 1977

[54] PROCESS FOR THE FORMATION AND RECOVERY OF POLY(BISBENZIMIDAZOENZOPHENAN-THROLINE)

[75] Inventors: Edward C. Chenevey, North Plainfield; Harry T. Hanson, Millburn, both of N.J.

[73] Assignee: Celanese Corporation, New York, N.Y.

[22] Filed: Feb. 5, 1976

[21] Appl. No.: 655,339

[52] U.S. Cl. .............................................. 260/78.41
[51] Int. Cl.$^2$ ................. C08G 20/00; C08G 20/32; C08G 33/02; C08G 20/20
[58] Field of Search .............................. 260/78.41

[56] References Cited
UNITED STATES PATENTS

| | | | |
|---|---|---|---|
| 3,539,677 | 11/1970 | Steinberg et al. | 260/78.41 |
| 3,560,444 | 2/1971 | Brunner | 260/78.41 |
| 3,574,170 | 4/1971 | Chenevey | 260/78.41 |
| 3,574,171 | 4/1971 | Chenevey et al. | 260/78.41 |
| 3,767,616 | 10/1973 | Zellner | 260/78.41 |
| 3,798,201 | 3/1974 | Saferstein et al. | 260/78.41 |
| 3,864,310 | 2/1975 | Saferstein | 260/78.41 |

*Primary Examiner*—Joseph L. Schofer
*Assistant Examiner*—Herbert J. Lilling

[57] ABSTRACT

An improved overall process is provided wherein poly(bisbenzimidazobenzophenanthroline) is formed on an expeditious basis and is recovered from the reaction mass in substantially pure form. Appropriate quantities of 1,4,5,8-tetracarboxy naphthalene dianhydride and 3,3',4,4'-tetraaminobiphenyl are condensed as defined) in a reaction zone while dissolved in molten antimony trichloride, and the resulting reaction mass containing the dissolved product is discharged into a precipitation zone containing hydrochloric acid (as defined). The resulting solid product is separated and dried. The liquid portion which is separated from the solid product contains antimony trichloride dissolved in hydrochloric acid and is subjected to distillation which substantially separates these components. The antimony trichloride is recycled to the reaction zone, and the hydrochloric acid is recycled to the precipitation zone.

10 Claims, 1 Drawing Figure

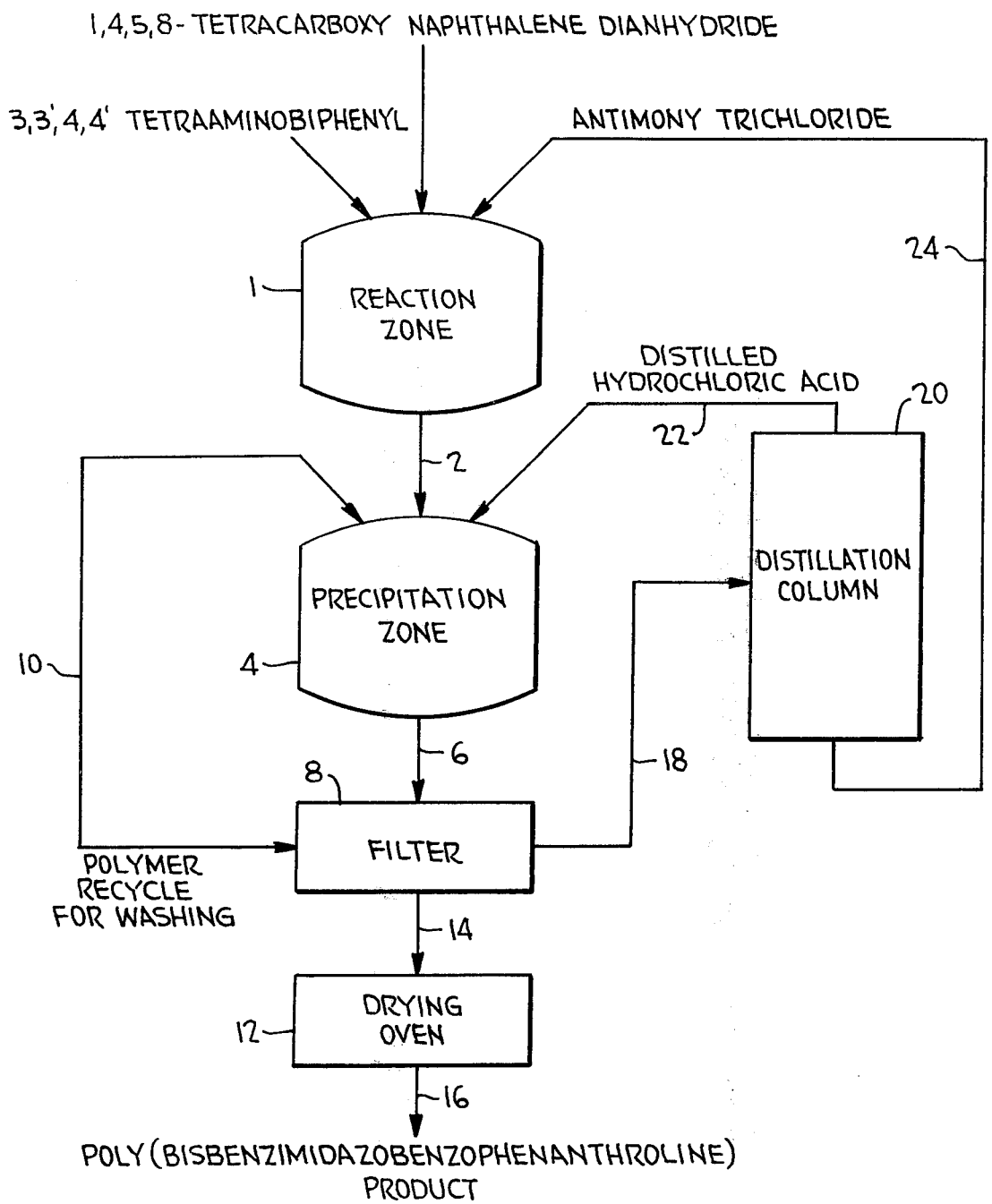

PROCESS FOR THE FORMATION AND RECOVERY OF POLY(BISBENZIMIDAZOENZOPHENANTHROLINE)

BACKGROUND OF THE INVENTION

In recent years considerable attention has been focused upon the development of polymers having high temperature resistance. Such polymers are useful, for instance, in the fabrication of textiles suitable for high temperature applications such as reentry parachutes for space vehicles, and applications where extreme non-flammability is desired.

Poly(bisbenzimidazobenzophenanthroline) when formed into fibers and films is recognized to be useful in the fabrication of extremely attractive products which are capable of withstanding highly elevated temperatures. Heretofore, poly(bisbenzimidazobenzophenanthroline) has been produced by a condensation reaction in a variety of polymerization media such as phosphoric acid (See U.S. Pat. Nos. 3,539,677 and 3,574,170), a molten Lewis acid solvent (See U.S. Pat. Nos. 3,798,201 and 3,864,310), and a sulfone (See commonly assigned U.S. Ser. No. 424,996, filed Dec. 14, 1973). Also, reference to the possible use of other organic solvents as a reaction medium has generally been alluded to in the literature.

Heretofore when phosphoric acid has served as the polymerization medium expensive tantalum reaction vessels commonly are required which are able to withstand the corrosive action of phosphoric acid at elevated temperatures. Recovery of dilute phosphoric acid generated in the process requires a substantial amount of energy and expense. In contrast reactions with molten Lewis acids can be done in glass vessels, however, when molten Lewis acids (e.g., antimony trichloride) have been utilized as the reaction medium, product recovery has proven to be tedious and unduly time consuming particularly when a larger than laboratory scale polymerization is attempted. For instance, a methylene chloride extraction of antimony trichloride has been found to be extremely slow if a high purity product is desired.

It is an object of the present invention to provide an improved overall process for the formation and recovery of poly(bisbenzimidazobenzophenanthroline).

It is an object of the present invention to provide an improved overall process for the formation of poly(bisbenzimidazobenzophenanthroline) employing an antimony trichloride polymerization medium wherein the product may be readily recovered.

It is another object of the present invention to provide an improved polymerization and recovery process for poly(bisbenzimidazobenzophenanthroline) employing a substantially closed loop system wherein the reaction medium and the precipitation medium effectively are conserved and recycled.

These and other objects, as well as the scope, nature, and utilization of the process of the present invention will be apparent to those skilled in the art from the following description and appended claims.

SUMMARY OF THE INVENTION

It has been found that an improved process for the production and recovery of poly(bisbenzimidazobenzophenanthroline) comprises:

a. condensing substantially equimolar quantities of 1,4,5,8-tetracarboxy naphthalene dianhydride and 3,3',4,4'-tetraaminobiphenyl while dissolved in a reaction zone in molten antimony trichloride in a total concentration of about 3 to 10 percent by weight based upon the total weight of the reactants and the antimony trichloride while heating at a temperature of about 150° to 200° C. for about 2 to 10 hours, b. discharging while at an elevated temperature the resulting reaction mass wherein the poly(bisbenzimidazobenzophenanthroline) is dissolved in antimony trichloride from the reaction zone into a precipitation zone containing hydrochloric acid having a hydrogen chloride content of about 10 to 20 percent by weight which is agitated and maintained at a temperature of about 50° to 100° C. wherein the poly(bisbenzimidazobenzophenanthroline) is precipitated in particulate form, and the antimony trichloride is dissolved, c. substantially separating the precipitated poly(bisbenzimidazobenzophenanthroline) particles from the hydrochloric acid and the antimony trichloride, d. drying the poly(bisbenzimidazobenzophenanthroline) particles, e. distilling the hydrochloric acid containing dissolved antimony trichloride resulting from step (c) to recover hydrochloric acid and antimony trichloride, and f. recycling the antimony trichloride resulting from the distillation of step (e) to the reaction zone of step (a) and recycling the hydrochloric acid resulting from the distillation step (e) to the precipitation zone of step (b).

DESCRIPTION OF THE DRAWING

The drawing is a schematic illustration of an apparatus arrangement capable of carrying out the process of the present invention.

DESCRIPTION OF THE PREFERRED EMBODIMENTS

The reactants employed to form poly(bisbenzimidazobenzophenanthroline) in the present process are 1,4,5,8-tetracarboxy naphthalene dianhydride and 3,3',4,4'-tetraaminobiphenyl (i.e., 3,3'-diaminobenzidine). The reactants should be of high purity. The reactants are provided in substantially equimolar quantities in a reaction zone (i.e., a polymerization zone) while dissolved in molten antimony trichloride at a relatively dilute concentration. For instance, the reactants may be initially dissolved in the molten antimony trichloride in a total concentration of about 3 to 10 percent by weight based upon the total weight of the reactants and antimony trichloride, and preferably in a concentration of about 4 to 5 percent by weight.

If the concentration of the reactants in the molten antimony trichloride is much greater than indicated then the reaction mass tends to be unduly viscous. It is preferred that the concentration of the reactants in the molten antimony trichloride be adjusted so that at the end of the polymerization reaction the contents of the reaction zone exhibit an inherent viscosity of about 2.5 to 3.0 and produce a stirrable reaction mass. Such inherent viscosity conveniently may be determined by observing the reaction solution viscosity, e.g. by monitoring the torque of a stirrer. As the polymerization reaction progresses the viscosity of the reaction mass increases.

Suitable reaction temperatures commonly range from about 150° to 200° C., and preferably from about 170° to 190° C. Suitable reaction times at such temperatures commonly range from about 2 to 10 hours, and preferably about 3 to 6 hours. The longer reaction times generally are required when operating at the lower solids levels. A higher molecular weight product tends to be formed at higher solids levels.

Unlike poly(bisbenzimidazobenzophenanthroline) synthesis processes employing a phosphoric acid polymerization medium, the process of the present invention conveniently may be carried out in a glass or glass-lined reaction zone. It is preferred that the reaction be carried out in the substantial absence of oxygen and under a blanket of an inert gas, e.g., a nitrogen purge, so that the tetraamine will not be oxidized and atmospheric moisture will be excluded. While it is not essential that the contents of the reaction zone be agitated at all times during the polymerization reaction, it is preferred that agitation be carried out. Such agitation serves to bring the reactants into homogeneous admixture and to generally promote the rate of the desired polymerization reaction.

During the polymerization reaction water is evolved as a byproduct. At least a portion of this water may be removed from the reaction zone by use of an inert gas purge, etc. The remaining water product commonly reacts with a portion of the antimony trichloride to form antimony oxychloride (SbOCl), which is soluble in the antimony trichloride and the hydrochloric acid precipitation medium described hereafter. Such inert gas purge also serves to carry away hydrogen chloride gas generated during the polymerization reaction by hydrolysis of antimony trichloride.

The resulting reaction mass while at an elevated temperature (e.g., preferably at a temperature approaching that of the reaction zone or about 150° to 200° C.) wherein poly(bisbenzimidazobenzophenanthroline) is dissolved in antimony trichloride next is discharged from the reaction zone into a precipitation zone containing hydrochloric acid having a hydrogen chloride content of about 10 to 20 percent by weight. The reaction mass preferably is added to the precipitation zone gradually (i.e., by slightly opening the reactor discharge valve and letting the polymer mass flow out) where it is quenched. The precipitation zone is agitated (e.g., preferably by means of a central agitator with a cutting type blade) and is maintained at a temperature of about 50° to 100° C. As the dissolved poly(bisbenzimidazobenzophenanthroline) contacts the hydrochloric acid, the polymer undergoes precipitation and the antimony trichloride and other antimony by-products pass into solution.

The relative quantity of the hydrochloric acid in the precipitation zone is preferably selected so that it is several fold greater in volume than the reaction mass. The hydrochloric acid present in the precipitation zone is preferably constant boiling hydrochloric acid (i.e., having a boiling point of about 100° C.) which contains about 20 percent hydrogen chloride. If the concentration of hydrogen chloride in the hydrochloric acid is low, then white antimony salts remain in the precipitation liquor. If the concentration of hydrogen chloride in the hydrochloride acid is much above 20 percent by weight, then the acid fumes. The particularly preferred temperature for the precipitation zone is 80° to 100° C. The use of extensive agitation in the precipitation zone serves to insure the formation of relatively small particles of polymer precipitate. The precipitated poly(bisbenzimidazobenzophenanthroline) produced in the precipitation zone preferably assumes configuration resembling rice grains.

The precipitated poly(bisbenzimidazobenzophenanthroline) next is separated from the liquid portion (i.e., from the hydrochloric acid containing antimony trichloride and reaction by-products dissolved therein). The separation initially may be accomplished by filtration, centrifugation, decantation, etc. followed by washing. In a preferred embodiment of the process the initial separation is accomplished by use of a centrifuge or screen filter. The washing preferably is conducted by use of hydrochloric acid (e.g., that having a hydrogen chloride content of about 10 to 20 percent by weight and most preferably constant boiling hydrochloric acid) followed by water washing. Supplemental organic solvents such as methylene chloride, or other chlorinated solvents may be used during the wash procedure, but generally complicate the process without commensurate advantage. If desired, the particulate product may be returned to the vessel previously utilized as the precipitation zone following filtration, centrifugation or decantation, and there washed. Countercurrent wash procedures may be utilized.

Following the wash step the poly(bisbenzimidazobenzophenanthroline) product is dried in any convenient manner to yield a product which preferably is substantially free of the wash medium and contains less than 100 parts per million antimony trichloride by weight. For instance, suitable drying zones comprise a vacuum drier maintained at a temperature of about 100° to 200° C. wherein the product is placed for several hours. The resulting product commonly has an inherent viscosity of about 2 to 4 (preferably 2.5 to 3.5) determined by capillary viscometry of a 0.2 weight percent solution of polymer in 97 percent sulfuric acid at 25° C.

In accordance with the process of the present invention the hydrochloric acid containing dissolved antimony trichloride is subjected to distillation to initially obtain a water forerun which was produced during the polymerization reaction, and a stream of substantially pure constant boiling hydrochloric acid (i.e., containing about 20 percent by weight hydrogen chloride) which is next evolved at a temperature of about 100° C. and is recycled to the precipitation zone. There the constant boiling hydrochloric acid may be employed to precipitate an additional batch of poly(bisbenzimidazobenzophenanthroline) product or otherwise used to wash the product. Additionally, while undergoing distillation the antimony trichloride is evolved at a temperature of about 220° C. and is recycled to the reaction zone where it may be admixed with reactants to form additional poly(bisbenzimidazobenzophenanthroline) product. It is preferred that the antimony trichloride content of constant boiling hydrochloric acid which is distilled be maintained below 100 parts per million. Any antimony by-products are converted via thermal cracking to antimony trichloride during the distillation.

Accordingly, the process of the present invention may be carried out in accordance with a substantially closed loop system wherein the antimony trichloride and hydrochloric acid requirements are reutilized with minimal waste and minimal disposal problems. Fresh reactants are added to the recycled antimony trichloride, and the recycled hydrochloric acid is available for the precipitation and washing of product.

The poly(bisbenzimidazobenzophenanthroline) product may be solution spun to form high temperature resistant fibers in accordance with procedures known in the art, or otherwise utilized in end use applications requiring a polymeric material of unusually high thermal stability. For instance, a 5 percent by weight solution of the polymer in 96 to 100 percent by weight sulfuric acid may be converted to fiber by extrusion into a warm 70 percent by weight sulfuric acid bath. The resulting fiber may be neutralized with base, washed, dried, and drawn to produce a purple-black textile fiber. These fibers exhibit excellent short term strength retention when tested in air at 600° C. along with good tensile retention in loop, knot and yarn configurations, low moisture sensitivity, good light stability, good abrasion resistance, dimensional stability to repeated laundering, and excellent non-flammability characteristics.

The following Example is given as a specific illustration of the invention. It should be understood, however, that the invention is not limited to the specific details set forth in the Example. In the Example poly(bisbenzimidazobenzophenanthroline) was formed by the condensation of 1,4,5,8-tetracarboxy naphthalene dianhydride and 3,3',4,4'-tetraaminobiphenyl to yield a fully cyclicized polymer one isomer of which is illustrated in the following equation:

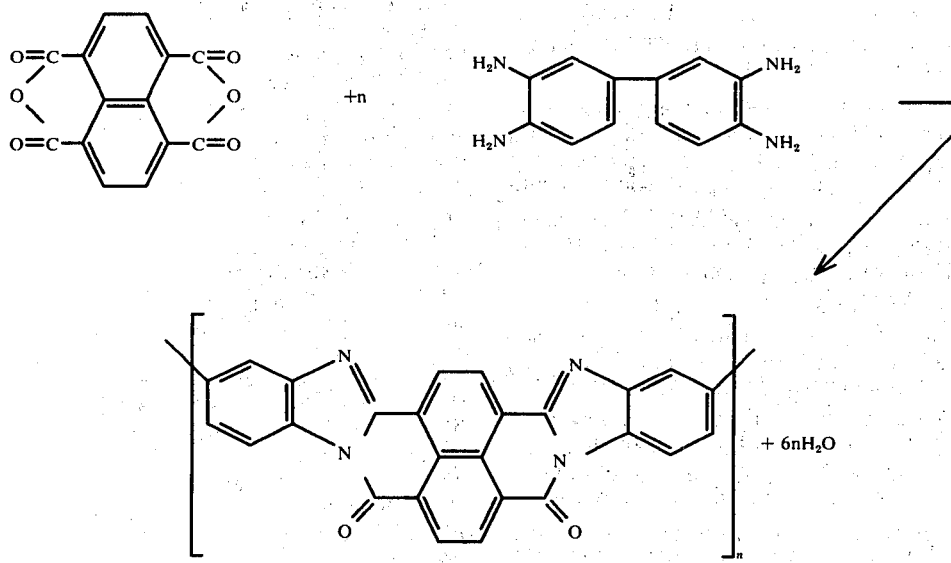

The specific isomer illustrated may be identified as poly[6,9-dihydro-6,9-dioxobisbenzimidazo(2,1-b:1',2'-j)benzo(1mn)(3,8)phenanthroline-2,13-diyl]. It will be apparent to those skilled in the art that various additional isomers will also be produced during the condensation reaction. During the description of the Example reference is made to the drawing.

Equimolar quantities of 1,4,5,8-tetracarboxy naphthalene dianhydride and 3,3',4,4'-tetraaminobiphenyl are added to glass-lined reaction zone 1 and are dissolved in molten antimony trichloride. The reaction zone is provided with a nitrogen purge and an anchor type agitator. The reactants are dissolved in the molten antimony trichloride in a total concentration of 4 percent by weight based upon the total weight of the reactants and the antimony trichloride, and the contents of the reaction zone are maintained at 180° C. for 5 hours while undergoing agitation. The pressure in the reaction zone is maintained at atmospheric pressure with a slight nitrogen purge.

The resulting reaction mass while at a temperature of 180° C. gradually is discharged through line 2 to precipitation zone 4. The gradual discharge of the reaction mass requires about one-half hour and is accomplished by partially opening the reactor discharge valve. Line 2 is heated to prevent premature chilling of the reaction mass. The reaction mass which is introduced into the precipitation zone 4 contains the resulting poly(bisbenzimidazobenzophenanthroline) product and antimony by-products dissolved in molten antimony trichloride. The precipitation zone 4 is provided with a Cowles high speed cutting agitator. Within the precipitation zone is provided hydrochloric acid having a hydrogen chloride content of about 20 percent by weight (i.e., constant boiling hydrochloric acid) which is maintained at a temperature of about 80° C. The relative quantity of hydrochloric acid to reaction mass is about three times by volume. Upon contact with the hydrochloric acid, the poly(bisbenzimidazobenzophenanthroline) is precipitated as a string-like material which is chopped by the high speed agitator. The antimony trichloride and antimony by-products are dissolved in the hydrochloric acid. The precipitated polymer assumes a configuration resembling rice grains and is agitated in the precipitation zone for about 20 minutes subsequent to the addition of the reaction mass.

The contents of the reaction zone next are passed via line 6 to screen filter 8 where the poly(bisbenzimidazobenzophenanthroline) particles are separated from the liquid portion. The polymeric particles are recycled from the filter 8 to precipitation zone 4 through line 10 where they are sequentially washed several times with constant boiling hydrochloric acid, then with deionized water, and are finally passed to drying oven 12 via line 14. The drying oven is of the vacuum type and is maintained at about 180° C. After 90 minutes the final product is discharged via line 16. It is found that the final product has an inherent viscosity of 2.5 as determined by capillary viscometry of a 0.2 weight percent solution of polymer in 97 percent sulfuric acid at 25° C. The particulate product also contains less than 100 parts per million antimony.

The liquid resulting from the initial filtration separation at filter 8 as previously described is passed through line 18 to distillation column 20. The distillation column 20 is glass-lined with a center feed. From the top a stream of substantially pure hydrochloric acid containing less than 100 parts per million antimony trichloride is distilled and is recycled via line 22 to precipitation zone 4. From the bottom a stream of molten antimony trichloride is recycled via line 24 to reaction zone 1.

Although the invention has been described with a preferred embodiment, it is to be understood that variations and modifications may be resorted to as will be apparent to those skilled in the art. Such variations and modifications are to be considered within the purview and scope of the claims appended hereto.

We claim:

1. An improved process for the production and recovery of poly(bisbenzimidazobenzophenanthroline) comprising:
   a. condensing substantially equimolar quantities of 1,4,5,8-tetracarboxy naphthalene dianhydride and 3,3',4,4'-tetraaminobiphenyl while dissolved in a reaction zone in molten antimony trichloride in a total concentration of about 3 to 10 percent by weight based upon the total weight of said reactants and said antimony trichloride while heating at a temperature of about 150 to 200° C. for about 2 to 10 hours,
   b. discharging while at an elevated temperature the resulting reaction mass wherein said poly(bisbenzimidazobenzophenanthroline) is dissolved in antimony trichloride from said reaction zone into a precipitation zone containing hydrochloric acid having a hydrogen chloride content of about 10 to 20 percent by weight which is agitated and maintained at a temperature of about 50° to 100° C. wherein said poly(bisbenzimidazobenzophenanthroline) is precipitated in particulate form and said antimony trichloride is dissolved,
   c. substantially separating said precipitated poly(bisbenzimidazobenzophenanthroline) particles from said hydrochloric acid and said antimony trichloride,
   d. drying said poly(bisbenzimidazobenzophenanthroline) particles,
   e. distilling said hydrochloric acid containing dissolved antimony trichloride resulting from step (c) to recover hydrochloric acid and antimony trichloride, and
   f. recycling said antimony trichloride resulting from said distillation of step (e) to said reaction zone of step (a), and recycling said hydrochloric acid resulting from said distillation step (e) to said precipitation zone of step (b).

2. An improved process according to claim 1 wherein said 1,4,5,8-tetracarboxy naphthalene dianhydride and 3,3',4,4'-tetraaminobiphenyl are initially dissolved in said molten antimony trichloride in said reaction zone in a concentration of about 4 to 5 percent by weight.

3. An improved process according to claim 1 wherein said reactants while dissolved in antimony trichloride are heated in said reaction zone at a temperature of about 170° to 190° C.

4. An improved process according to claim 1 wherein the contents of said reaction zone are agitated during the condensation of said 1,4,5,8-tetracarboxy naphthalene dianhydride and 3,3',4,4'-tetraaminobiphenyl to form poly(bisbenzimidazobenzophenanthroline).

5. An improved process according to claim 1 wherein said resulting reaction mass is at an elevated temperature of about 150° to 200° C. when discharged from said reaction zone into said precipitation zone.

6. An improved process according to claim 1 wherein at the time of said precipitation of said poly(bisbenzimidazobenzophenanthroline) said precipitation zone contains constant boiling hydrochloric acid having a hydrogen chloride content of about 20 percent by weight which is maintained at about 100° C.

7. An improved process according to claim 1 wherein said separation of said precipitated poly(bisbenzimidazobenzophenanthroline) particles from said hydrochloric acid and said antimony trichloride is accomplished by filtration and washing.

8. An improved process according to claim 7 wherein said washing initially is conducted with hydrochloric acid and subsequently is conducted with water.

9. An improved process according to claim 1 wherein said drying zone is provided at a temperature of about 100° to 200° C.

10. An improved process according to claim 1 wherein the final poly(bisbenzimidazobenzophenanthroline) product contains less than 100 parts per million antimony trichloride and has an inherent viscosity of about 2.5 to 3.5 measured by capillary viscometry of a 0.2 weight percent solution of polymer in 97 percent sulfuric acid at 25° C.

* * * * *